United States Patent [19]

Eyrisch et al.

[11] Patent Number: 5,973,108
[45] Date of Patent: Oct. 26, 1999

[54] UNSATURATED POLYCATIONS AND THEIR PREPARATION AND USE

[75] Inventors: Oliver Eyrisch, Essen; Guillermo Maier, Haining, both of Germany

[73] Assignee: Clariant GmbH, Frankfurt, Germany

[21] Appl. No.: 09/075,662

[22] Filed: May 11, 1998

[30] Foreign Application Priority Data

May 12, 1997 [DE] Germany ............ 197 19 900

[51] Int. Cl.[6] .................. C08G 73/00; C08J 3/09
[52] U.S. Cl. .............. 528/489; 528/422; 528/423; 528/486; 525/191; 525/259; 525/279; 514/642
[58] Field of Search ................ 528/422, 423, 528/486, 489; 525/259, 279, 191; 54/642

[56] References Cited

U.S. PATENT DOCUMENTS

| | | |
|---|---|---|
| 3,288,770 | 11/1966 | Butler . |
| 3,544,318 | 12/1970 | Booth et al. . |
| 3,862,091 | 1/1975 | Barabas et al. . |
| 4,626,577 | 12/1986 | Harada . |
| 4,778,725 | 10/1988 | Serizawa et al. . |
| 5,211,854 | 5/1993 | Liao et al. . |

FOREIGN PATENT DOCUMENTS

| | | |
|---|---|---|
| 0145309 | 6/1985 | European Pat. Off. . |
| 0264710 | 4/1988 | European Pat. Off. . |
| 1494438 | 9/1967 | France . |
| 127729 | 10/1977 | Germany . |
| 128189 | 11/1977 | Germany . |
| 128247 | 11/1977 | Germany . |
| 4200139 | 1/1992 | Germany . |
| 4200133 | 7/1993 | Germany . |
| 4200136 | 7/1993 | Germany . |
| 19509982 | 9/1996 | Germany . |
| WO 96/29463 | 9/1996 | WIPO . |

OTHER PUBLICATIONS

EPO Search Report.
V. De Vynck: "Synthesis and Polymerization of N, N–Diallylpyrrolidinium Bromide," Macromol. Rapid Commun. Bd. 18, Feb. 1997, Seiten 149–156, XP000684266.
Derwent Patent Family Report and/or Abstract.
Vollmert, GrundriB der Makromolekularen Chemie, Springer–Verlag, Berlin, 1962, p. 196.
G. B. Butler, J. Macromol, Sci. A26, 1989, p. 681.
Abstract for DE 4200135, patent not available

*Primary Examiner*—Duc Truong
*Attorney, Agent, or Firm*—Scott E. Hanf

[57] ABSTRACT

Novel water-soluble homo- or copolymers are described which comprise 1,1-diallyl-3,4-dimethylenepyrrolidinium cations in the polymer and can additionally include 1,1-dialkyl-3,4-dimethylenepyrrolidinium cations. The polymers are prepared by first polymerizing a diallylammonium salt of the formula $[(CH_2=CH-CH_2)_2NH_2]^+X^-$ in which $X^-$ is the anion of any Brönstedt acid and, preferably, a halide, alone or together with an unsaturated comonomer, and reacting the resulting polymer or copolymer with a base and an allyl halide. The novel polymers are preferably used for treating textiles.

15 Claims, No Drawings

UNSATURATED POLYCATIONS AND THEIR PREPARATION AND USE

Crosslinkable polyelectrolytes play an important part in diverse areas of application. For example, in the presence of textiles they can be crosslinked to improve the wet fastness properties of the fabric and so prevent or retard the bleeding of dyed or printed textiles.

DE-A-1 95 09 982 describes aftertreatment compositions for textiles. This application relates to a polymeric aftertreatment composition obtained by reacting a homopolymer of diallylamine or N-methyldiamine, or a copolymer of diallyamine and N-methyidiallylamine, with an epihalohydrin, in the presence or absence of an aliphatic amine or of a polyamine or else of a product of the reaction of epihalohydrin with an aliphatic amine or polyamine. The process is laborious and is not without hazard owing to the toxicity of the epihalohydrins and of corresponding halohydrin derivatives.

Polycations also have the ability to give textile antistatic and softening properties. Furthermore, they may enhance the crease resistance and make ironing easier. Activated crosslinkable polycations are also suitable for impregnating paper.

The conventional free-radical polymerization of triallylamine or tetraallylammonium salts results, in the case of copolymerizations, in highly branched, water-insoluble polymers, and is therefore unsuitable for preparing linear unsaturated polycations.

The synthesis of water-soluble polymeric quaternary ammonium salts by free-radical polymerization of diallylammonium salts is known and leads to linear polymer structures. An example of this is the solution polymerization of diallyldimethylammonium chloride (DADMAC), which is described in U.S. Pat. No. 3,288,770 or in DD-B-127 729.

In order to obtain particular product properties or to synthesize polymers of relatively high molecular weight, copolymerizations with polyfunctional, crosslinking comonomers are employed. Mixtures of the ammonium monomer with bisallyl esters of dicarboxylic acids are polymerized by free-radical initiation in aqueous solution (DD-B-127 729, DD-B-128 189 or DD-B-128 247). Such branched structures are also obtained in agreement with the teaching of FR-A-1 494 438 or of U.S. Pat. No. 3,544,318. Here, triallyl- or tetraallylammonium salts have been used as the chain-branching agent. The small amounts of chain branching agents required are added to the batch at the beginning of the polymerization. It is well known that at a concentration of the polyfunctional monomer of more than 0.1% the resulting polymer is partly or completely crosslinked. The usual result of this is that the polymer is insoluble in the solvent (Vollmert, Grundriβ der Makromolekularen Chemie, Springer-Verlag, Berlin, 1962, page 196).

EP-A-0 264 710 presents an improved process for copolymerizing DADMAC with polyfunctional monomers of this kind. If a special metering technique is employed for the comonomer, it is possible to incorporate it to a relatively large extent. This results in polymers of relatively high molecular weight, and the risk of gelling in the course of polymerization is reduced. For a successful polymerization result it is generally necessary to operate a fairly complicated addition program.

In all cases where polyfunctional, crosslinking comonomers are used as agents for increasing the molecular weight, however, there is a technological risk owing to the possibility of gelling. On the other hand it is unavoidable, owing to premature termination of reaction, that not only highly branched polymer chains of high molecular weight but also an intolerable fraction of residual monomers will remain, as well as macromolecules of relatively low molecular weight. Owing to the reduced activity in practical applications of the polyammonium salt, the low molecular weight fraction is a disadvantage.

Branched polymers can also be synthesized by a graft copolymerization process (for example, "grafting-on"). This process has also been applied to the synthesis of DADMAC-acrylamide copolymers (G. B. Butler, J. Macromol, Sci. A26, 1989, page 681). A copolymer of DADMAC and dihydroxyalkyl derivatives of acrylic acid is synthesized as a prepolymer and, using $Ce^{4+}$ salts as initiator, a free-radical grafting of acrylamide or of a mixture of acrylamide and DADMAC onto the prepolymer chain is achieved. High prepolymer concentrations are always required in order to obtain polymer yields of about 80%. From an industrial standpoint this is unacceptable.

Similarly, branched copolymers of acrylamide and cationic monomers, such as cationic, modified acrylic esters or acrylamides or diallylammonium salts, are synthesized by copolymerizing acrylamide with macromonomers of the cationic functionalized monomers having a double bond as terminal group, as described in U.S. Pat. No. 5,211,854.

In DE-A-42 00 133, DE-A-42 00 135 and DE-A-42 00 139, the sulfocyclopolymerization of diallyl-, triallyl- and tetraallylammonium salts produces polymeric pyrrolidinium salts. DE-A-42 00 136, in particular, describes the synthesis of poly(N-allyl-3,4-dimethylenepyrrolidinium) salts of the formula below in which R is hydrogen or alkyl.

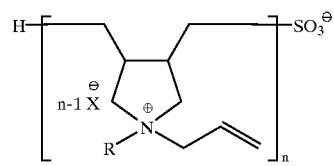

Our invention provides novel cationic polymers which comprise the N,N-diallyl-3,4-dimethylenepyrrolidinium group as an essential structural unit. The invention additionally comprises copolymers which can be prepared by reacting polymers comprising N,N-diallyl-3,4-dimethylenepyrrolidinium groups with reactive monomers or polymers.

Essential features of the invention are illustrated in the following formula scheme, based on one example:

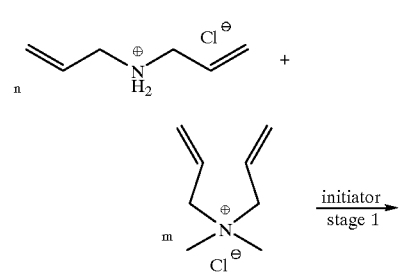

-continued

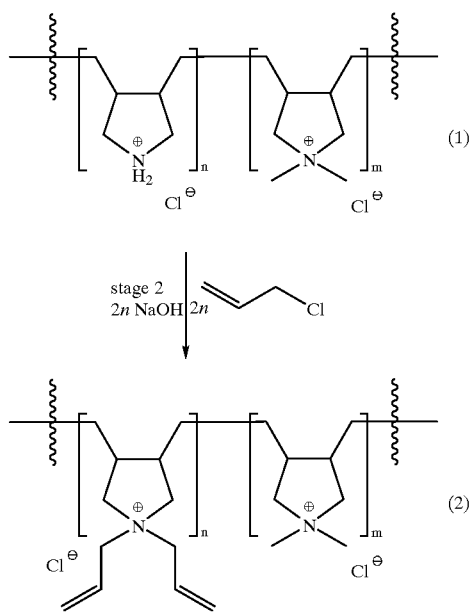

In stage 1, in a way which is known in principle, a prepolymer of the formula (1) is prepared from diallylammonium chloride and DADMAC in aqueous solution. In stage 2, this polymer is reacted with a base and allylated with an allyl halide, to give the novel polymers of the formula (2) in virtually quantitative yield. The base used is preferably 50% strength by weight sodium hydroxide solution. The preferred allylating agent employed is allyl chloride.

It has surprisingly been found that even with a substoichiometric amount of allyl chloride in the reaction of polymers of the formula (1) or other copolymers comprising 3,4-dimethylenepyrrolidinium cations there is preferential formation of N,N-diallyl-3,4-dimethylenepyrrolidinium units. This means that the intermediate with an allyl group is allylated much more rapidly than the 3,4-dimethylenepyrrolidinium cation in the prepolymer. Proof of this surprising effect has been obtained by means of $^{13}$C-NMR.

The preparation of appropriate prepolymers and of the polymers of the invention that are obtained from these prepolymers using allyl chloride is described below, the percentages being by weight. The abbreviation a.i. denotes active ingredient and AN acid number. Nitrogen equivalents are defined as mmol of N/g of substance.

1. Preparing the Prepolymers

Copolymer A:

(preparing a copolymer of DADMAC and diallylamine hydrochloride in a molar ratio of 4:1)

A 6 liter polymerization apparatus equipped with intensive condenser, dropping funnel, thermometer and vacuum controller is charged with 3.33 kg (8.8 mol) of DADMAC in aqueous form (a.i.: 43.3%) and 441.3 g (2.2 mol) of diallylammonium hydrochloride in aqueous form (a.i.: 66.6%) and also with 409.2 g of water. This initial charge is heated to an internal temperature of approximately 80° C., and a vacuum of approximately 800 mbar is applied. 37.7 g (0.17 mol) of ammonium peroxodisulfate in 181.3 g of water are metered in over the course of approximately 60 minutes. After 2 hours of intermediate reaction, a further 50.3 g (0.22 mol) of ammonium peroxodisulfate in 75.5 g of water are metered in at approximately 80° C. under a vacuum of approximately 470 mbar. Following a postreaction period of 2 hours the polymerization is at an end. Viscosity 25° C.: 589 mPas (a.i.: 39%)

Copolymer B:

(preparing a copolymer of DADMAC and diallylamine hydrochloride in a molar ratio of 9:1)

A 750 ml polymerization apparatus equipped with intensive condenser, thermometer and vacuum controller is charged with 242.1 g (0.9 mol) of DADMAC in aqueous form (a.i.: 60.1%), 9.7 g (0.1 mol) of diallylamine and 40.4 g of water. At room temperature, 25.5 g (0.1 mol) of dilute hydrochloric acid (a.i.: 14.3%) are metered in over the course of 6 minutes. The mixture is subsequently heated to approximately 80° C., and a vacuum of approximately 490 mbar is applied. 0.38 g (0.0017 mol) of ammonium peroxodisulfate in 1.8 g of water is metered in over the course of 16 minutes. Reaction is allowed to continue for 50 minutes. 0.76 g (0.0033 mol) of ammonium peroxodisulfate in 3.7 g of water is metered in over the course of 9 minutes. Reaction is allowed to continue for 1 hour. 2.28 g (0.010 mol) of ammonium peroxodisulfate and 11.0 g of water are metered in over the course of 5 minutes. Reaction is allowed to continue for 2 hours.

Copolymer C:

(preparing a copolymer from DADMAC and diallylamine hydrochloride in a molar ratio of 1:1)

A 750 ml of polymerization apparatus equipped with intensive condenser, thermometer and vacuum controller is charged with 186.7 g (0.5 mol) of DADMAC in aqueous form (a.i.: 43.3%) and 48.6 g (0.5 mol) of diallylamine. 119.9 g (0.5 mol) of dilute hydrochloric acid (AN: 234) are added at room temperature. The mixture is subsequently heated to approximately 80° C., and a vacuum of approximately 800 mbar is applied. 3.42 g (0.015 mol) of ammonium peroxodisulfate in 16.5 g of water are metered in over the course of 1.5 hours. After a postreaction period of 2 hours the polymerization is at an end.

Polymer D:

(preparing a copolymer from DADMAC and diallylamine hydrochloride in a molar ratio of 95:5)

A 6 liter polymerization apparatus equipped with intensive condenser, dropping funnel, thermometer and vacuum controller is charged with 2.81 kg (10.45 mmol) of DADMAC in aqueous form (a.i.: 60.1%) and with a mixture of 110.3 g (0.55 mol) of diallylamine hydrochloride in aqueous form (a.i.: 66.66%) and 1376.2 g of water. This initial charge is subsequently heated to an internal temperature of approximately 85° C., and a vacuum of approximately 800 mbar is applied. 37.7 g (0.17 mol) of ammonium peroxodisulfate in 181.3 g of water are metered in over the course of approximately 60 minutes. After a postreaction period of 2 hours the polymerization is at an end. Viscosity 25° C.: 490 mPas (a.i.: 40%)

Polymer E:

(preparing a copolymer from DADMAC and diallylamine hydrochloride in a molar ratio of 99:1)

A 6 liter polymerization apparatus equipped with intensive condenser, dropping funnel, thermometer and vacuum controller is charged with 2.93 kg (10.89 mmol) of DADMAC in aqueous form (a.i.: 60.1%) and with a mixture of 22.1 g (0.11 mol) of diallylamine hydrochloride in aqueous form (a.i.: 66.6%) and 1325.6 g of water. This initial charge is subsequently heated to an internal temperature of approximately 82° C., and a vacuum of approximately 800 mbar is applied. 37.7 g (0.17 mol) of ammonium peroxodisulfate in 181.3 g of water are metered in over the course of approximately 60 minutes. After a postreaction period of 2 hours the polymerization is at an end. Viscosity 25° C.: 626 mPas (a.i.: 40%)

Polymer F:

(preparing a homopolymer of 100% diallylamine hydrochloride)

A 750 ml polymerization apparatus equipped with intensive condenser, thermometer and vacuum controller is charged with 200.6 g (1.0 mol) of diallylamine hydrochloride in aqueous form (a.i.: 66.6%) and 121.3 g of water. This initial charge is subsequently heated to approximately 80° C., and a vacuum of approximately 800 mbar is applied. 3.42 g (0.015 mol) of ammonium peroxodisulfate in 16.5 g of water are metered in over the course of 1 hour. Reaction is allowed to continue for 2 hours. A further 3.42 g (0.015 mol) of ammonium peroxodisulfate in 16.5 g of water are metered in over the course of 10 minutes. After a postreaction period of 2 hours the reaction is at an end.

Copolymer G:

[preparing a copolymer of DADMAC and 3-(dimethylamino)propyl-methacrylamide hydrochloride in a molar ratio of 4:1]

A 750 ml polymerization apparatus equipped with intensive condenser, thermometer and vacuum controller is charged with 215.2 g (0.8 mol) of DADMAC in aqueous form (a.i.: 60.15), 111.0 g of water and 34.1 g (0.2 mol) of 3-(dimethylamino)propylmethacrylamide. 50.9 g (0.20 mol) of dilute hydrochloric acid (a.i.: 14.3%) are metered in over the course of 7 minutes at room temperature. The mixture is subsequently heated to approximately 89° C., and a vacuum of approximately 800 bar is applied. 3.42 g (0.015 mol) of ammonium peroxodisulfate in 16.5 g of water are metered in over the course of 85 minutes. Postreaction is allowed to continue for 2 hours. Then a further 3.42 g (0.015 mol) of ammonium peroxodisulfate in 16.5 g of water are added over the course of 10 minutes. Following a postreaction period of 2 hours the reaction is at an end.

Copolymer H:

[preparing a copolymer of 3-(dimethylamino) propylmethacrylamide hydrochloride and dialylamine hydrochloride in a molar ratio of 4:1]

A 750 ml polymerization apparatus equipped with intensive condenser, thermometer and vacuum controller is charged with 136.2 g (0.8 mol) of 3-(dimethylamino) propylmethacrylamide, 40.1 g (0.2 mol) of diallylamine hydrochloride (a.i.: 66.6%) and 233.8 g of water. 78.9 g (0.8 mol) of concentrated hydrochloric acid are metered in over the course of 10 minutes at room temperature. The mixture is subsequently heated to approximately 89° C., and a vacuum of approximately 800 mbar is applied. 3.42 g (0.015 mol) of ammonium peroxodisulfate in 16.5 g of water are metered in over the course of 60 minutes. Reaction is allowed to continue for 2 hours. There are two further additions of in each case 3.42 g (0.015 mol) of ammonium peroxodisulfate in 16.5 g of water over the course of 45 minutes and 13.7 g (0.06 mol) of ammonium peroxodisulfate in 20.5 g of water over the course of 25 minutes. Following a postreaction period of 2 hours the reaction is at an end.

Copolymer I:

[preparing a copolymer of 3-(dimethylamino) propylmethacrylamide hydrochloride and dialylamine hydrochloride in a molar ratio of 1:1]

A 750 ml polymerization apparatus equipped with intensive condenser, thermometer and vacuum controller is charged with 85.1 g (0.5 mol) of 3-(dimethylamino) propylmethacrylamide, 48.6 g (0.5 mol) of diallylamine and 21.5 g of water. 254.7 g (1.0 mol) of dilute hydrochloric acid (a.i.: 14.3%) are metered in over the course of 10 minutes at room temperature. The mixture is subsequently heated to approximately 89° C., and a vacuum of approximately 800 mbar is applied. 6.84 g (0.030 mol) of ammonium peroxodisulfate in 16.0 g of water are metered in over the course of 60 minutes. Following a postreaction period of 2 hours the reaction is at an end.

Copolymer J: [preparing a copolymer of 2-(dimethylamino)ethyl methacrylate hydrochloride and diallylamine hydrochloride in a molar ratio of 4:1]

A 750 ml polymerization apparatus equipped with intensive condenser, thermometer and vacuum controller is charged with 56.5 g (0.36 mol) of 2-(dimethylamino)ethyl methacrylate, 8.7 g (0.09 mol) of diallylamine and 16.8 g of water. 114.6 g (0.45 mol) of dilute hydrochloric acid (a.i.: 14.3%) are metered in over the course of 7 minutes at room temperature. The mixture is subsequently heated to approximately 89° C., and a vacuum of approximately 800 mbar is applied. 3.1 g (0.0135 mol) of ammonium peroxodisulfate in 7.2 g of water are metered in over the course of 60 minutes. Following a postreaction period of 2 hours the reaction is at an end.

Copolymer K: (preparing a copolymer of DADMAC, acrylamide and diallylamine hydrochloride in a molar ratio of 4.5:4.5:1)

A 750 ml polymerization apparatus equipped with intensive condenser, thermometer and vacuum controller is charged with 160.6 g (0.6 mol) of DADMAC in aqueous form (a.i.: 60.4%), 42.6 g (0.6 mol) of acrylamide, 26.7 g 0.133 mol) of diallylamine hydrochloride (a.i.: 66.6%) and 161.2 g of water. The mixture is heated to approximately 89° C., and a vacuum of approximately 800 mbar is applied. 2.1 g (0.009 mol) of ammonium peroxodisulfate in 9.8 g of water are metered in over the course of 60 minutes. Following a postreaction period of 2 hours the reaction is at an end.

2. Reactions of the Prepolymers with Allyl Chloride, in Accordance with the Invention:

Reacting copolymer A with allyl chloride:

A 4 liter stirred apparatus is charged with 2.1 kg (5.15 mol nitrogen equivalents) of copolymer A. 109.8 g (1.37 mol) of 50% strength sodium hydroxide solution are added over the course of 3 hours at from 25 to 60° C. The mixture is subsequently stirred at 50° C. for 1.5 hours. 78.7 g (1.03 mol) of allyl chloride are added over 50 minutes at 50° C. Stirring is continued for 20 minutes. Then 82.2 g (1.03 mol) of 50% strength sodium hydroxide solution are added over the course of 13 minutes at 50° C. An intermediate reaction period of 22 minutes at 50° C. follows. Subsequently, 78.7 g (1.03 mol) of allyl chloride are metered in over the course of 32 minutes. After 2 hours at 50° C., reaction is quantitative. Viscosity 25° C.: 821 mPas (a.i.: 43%)

Reacting copolymer B with allyl chloride:

A 1000 ml stirred apparatus is charged with 308.0 g (0.78 mol nitrogen equivalents) of copolymer D and 102.7 g of water. 7.8 g (0.098 mol) of 50% strength sodium hydroxide solution are added at room temperature over the course of 2.5 hours. The mixture is subsequently heated to 50° C. and 11.0 g (0.14 mol) of allyl chloride are added over the course of 15 minutes. The reaction is allowed to continue at 50° C. for 2.25 hours and 5.7 g (0.072 mol) of 50% strength sodium hydroxide solution are added all at once. Following postreaction for 2 hours the reaction is at an end.

Reacting copolymer C with allyl chloride:

A 250 ml stirred apparatus is charged with 63.8 g (0.18 mol nitrogen equivalents) of copolymer C. Subsequently, 6.9 g (0.086 mol) of 50% strength sodium hydroxide solution are added at room temperature over the course of 2 minutes. Reaction is allowed to continue for 15 minutes.

Then 6.6 g (0.086 mol) of allyl chloride are added in portions at 50° C. over the course of 2.5 hours. A postreaction of 0.5 hours ends the reaction.

Reacting copolymer D with allyl chloride:

A 4 liter stirred apparatus is charged with 2.03 kg (5.0 mol nitrogen equivalents) of copolymer D. 30.1 g (0.38 mol) of 50% strength sodium hydroxide solution are added over the course of 3 hours at from 25 to 60° C. Stirring is continued for 0.5 hours at 50° C. 19.1 g (0.25 mol) of allyl chloride are added over 6 minutes at 50° C. Stirring is continued for 60 minutes. Then 19.9 g (0.25 mol) of 50% strength sodium hydroxide solution are added over the course of 5 minutes at 50° C. An intermediate reaction period of 20 minutes at 50° C. follows. Subsequently, 19.1 g (0.25 mol) of allyl chloride are metered in over the course of 19 minutes. After 2 hours at 50° C. the reaction is quantitative. Viscosity 25° C.: 521 mPas (a.i.: 40%)

Reacting copolymer E with allyl chloride:

A 4 liter stirred apparatus is charged with 2.04 kg (5.0 mol nitrogen equivalents) of copolymer E. 10.6 g (0.133 mol) of 50% strength sodium hydroxide solution are added over the course of 1 hour at from 25 to 60° C. Stirring is continued for 0.5 hours at 50° C. 4.2 g (0.05 mol) of allyl chloride are added over 1 minute at 50° C. Stirring is continued for 30 minutes. Then 4.4 g (0.05 mol) of 50% strength sodium hydroxide solution are added over the course of one minute at 50° C. An intermediate reaction period of 15 minutes at 50° C. follows. Subsequently, 4.2 g (0.05 mol) of allyl chloride are metered in over the course of one minute. After 2 hours at 50° C. the reaction is quantitative. Viscosity 25° C.: 662 mPas (a.i.: 40%)

Reacting polymer F with allyl chloride:

A 0.5 liter stirred apparatus is charged with 130.0 kg (0.36 mol nitrogen equivalents) of polymer F and 60 g of water. 36.3 g (0.45 mol) of 50% strength sodium hydroxide solution are added in 0.5 hours at from 25 to 50° C. Stirring is continued for 0.5 hours at 50° C. 19.2 g (0.25 mol) of allyl chloride are added over the course of 18 minutes at 50° C. Stirring is continued for 80 minutes, during which the batch is diluted with 63 g of water. Then 20.1 g (0.25 mol) of 50% strength sodium hydroxide solution are added over the course of 4 minutes at 50° C. An intermediate reaction period of 20 minutes at 50° C. follows. Subsequently, 19.2 g (0.25 mol) of allyl chloride are metered in over the course of 13 minutes. After 4 hours at 50° C. the reaction is quantitative. During this postreaction period, the batch is again diluted with 30 g of water.

Reacting copolymer G with allyl chloride:

0.25 liter stirred apparatus is charged with 207.1 g (0.46 mol nitrogen equivalents) of copolymer G. 6.3 g (0.08 mol) of 50% strength sodium hydroxide solution are added over the course of 2 minutes at 25° C. Stirring is continued at 25° C. for 4 hours. The mixture is subsequently heated to an internal temperature of 50° C. 6.5 g (0.08 mol) of allyl chloride are added over the course of 10 minutes at 50° C. A postreaction period of 2.5 hours at 50° C. ends the reaction.

Reacting copolymer H with allyl chloride:

A 0.5 liter stirred apparatus is charged with 225.2 g (0.4 mol nitrogen equivalents) of copolymer H. 39.7 g (0.50 mol) of 50% strength sodium hydroxide solution are added over the course of 5 hours at 25° C. Stirring is continued at 25° C. for 2 hours. The mixture is subsequently heated to an internal temperature of 50° C. 28.5 g (0.37 mol) of allyl chloride are added over the course of 45 minutes at 50° C. Stirring is continued at 50° C. for 1 hour. Then 6.0 g (0.07 mol) of sodium hydroxide solution are added all at once. Stirring is again continued at 50° C. for 1 hour. 5.7 g (0.07 mol) of allyl chloride are added over 3 minutes at 50° C. A postreaction period of 2 hours ends the reaction.

Reacting copolymer I with allyl chloride:

A 0.5 liter stirred apparatus is charged with 172.8 g (0.4 mol nitrogen equivalents) of copolymer J. 34.7 g (0.44 mol) of 50% strength sodium hydroxide solution are added over the course of 6 minutes at room temperature, with simultaneous heating to an internal temperature of 50° C. Stirring is continued at 50° C. for 1 hour. 29.1 g (0.38 mol) of allyl chloride are added over the course of 45 minutes at 50° C. Stirring is continued at 50° C. for 1 hour. Then 15.2 g (0.19 mol) of sodium hydroxide solution are added over the course of 6 minutes. Stirring is continued at 50° C. for 50 minutes. 14.5 g (0.19 mol) of allyl chloride are added over 4 minutes at 50° C. A postreaction period of 3 hours ends the reaction.

Reacting copolymer J with allyl chloride:

A 0.5 liter stirred apparatus is charged with 184.5 g (0.4 mol nitrogen equivalents) of copolymer J. 34.7 g (0.44 mol) of 50% strength sodium hydroxide solution are added over the course of 6 minutes at room temperature, with simultaneous heating to an internal temperature of 50° C. Stirring is continued at 50° C. for 1 hour. 29.1 g (0.38 mol) of allyl chloride are added over the course of 45 minutes at 50° C. Stirring is continued at 50° C. for 1 hour. Then 6.19 (0.076 mol) of sodium hydroxide solution are added over the course of 6 minutes. Stirring is continued at 50° C. for 50 minutes. 5.8 g (0.076 mol) of allyl chloride are added over 4 minutes at 50° C. A postreaction period of 3 hours ends the reaction.

Reacting copolymer K with allyl chloride:

A 0.5 liter stirred apparatus is charged with 270.0 g (0.65 mol nitrogen equivalents) of copolymer K. This initial charge is heated to 50° C. and 135 g of water are added so that the mixture is stirrable. 6.0 g (0.075 mol) of 50% strength sodium hydroxide solution are added over the course of 6 minutes. The mixture becomes increasingly viscous again, and so a further 50 ml of water are added. Stirring is continued at 50° C. for 1 hour. 4.7 g (0.062 mol) of allyl chloride are added over the course of 10 minutes at 50° C. Stirring is continued at 50° C. for 1.5 hours. Then 5.0 g (0.062 mol) of sodium hydroxide solution are added over the course of 6 minutes. Stirring is continued at 50° C. for 1.5 hours and a further 50 ml of water are added. 4.7 g (0.062 mol) of allyl chloride are added over 4 minutes at 50° C. A postreaction period of 3 hours ends the reaction.

We claim:

1. A water-soluble homo- or copolymer containing in the polymer as a structural unit 1,1-diallyl-3,4-dimethylenepyrrolidinium cations of the structure

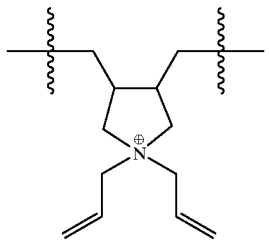

2. A copolymer as claimed in claim 1 comprising as a further structural unit 1,1-dialkyl-3,4-dimethylenepyrrolidinium cations where the alkyl groups contain 1 to 12 carbon atoms.

3. A copolymer as claimed in claim 1, which is prepared using one or more of the comonomers:

a) dimethylaminoethyl acrylate b) dimethylaminoethyl methacrylate c) dimethylaminopropylmethacrylamide d) dimethylaminomethylacrylamide e) acryloxyethyltrimethylammonium chloride f) methacryloxyethyltrimethylammonium chloride g) methacrylamidopropyltrimethylammonium chloride h) N,N-dimethylaminoalkylcarboxylic acid allyl esters i) acrylamide j) methacrylamide.

4. A copolymer as claimed in one or more of claims 1 to 3, wherein the molar ratio of comonomeric units to 1,1-dialkyl-3,4-dimethylenepyrrolidinium groups is between 1 and 500.

5. A process for preparing a homo-or copolymer as claimed in claim 1 which comprises a) polymerizing a diallylammonium salt of the formula $((CH_2=CH-CH_2)_2NH_2)^+X$ in which X is the anion of any Bronstedt acid, and b) reacting the resulting polymer or copolymer with a base and an allyl halide.

6. The process as claimed in claim 5, wherein the base used is sodium hydroxide solution and/or potassium hydroxide solution.

7. The process as claimed in claim 5, wherein the allyl halide used is allyl chloride.

8. A method of allylating the polymer or copolymer obtained as claimed in claim 5, step a) which comprises using from 1.5 to 2.0 mol of allyl chloride per nitrogen equivalent.

9. The process as claimed in claim 5, wherein a diallyl-dialkylammonium halide is used as a comonomer in step a).

10. The process as claimed in claim 5, wherein at least one comonomer is selected from the group: dimethylaminoethyl acrylate; dimethylaminoethyl methacrylate; dimethylaminopropylmethacrylamide; dimethylaminomethylacrylamide; acryloxyethyltrimethylammonium chloride; methacryloxyethyltrimethylammonium chloride; methacrylamideopropyltrimethylammonium chloride; N,N-dimethylaminoalkylcarboxylic acid allyl esters; acrylamide; methacrylamide.

11. A process of using a homo- or copolymer as claimed in claim 1 as a textile treatment comprising the steps of:

providing a textile material;

providing said homo- or copolymer; and applying said homo- or copolymer to said textile material.

12. A copolymer as claimed in claim 1 comprising as a further structural unit 1,1-dialkyl-3,4-dimethylenepyrrolidinium cations where the alkyl groups contain 1 to 3 carbon atoms.

13. A copolymer as claimed in claim 1, wherein the molar ratio of comonomeric units to 1,1-dialkyl-3,4-dimethylenepyrrolidinium groups is between 2 and 100.

14. A copolymer as claimed in claim 1, wherein the molar ratio of comonomeric units to 1,1-dialkyl-3,4-dimethylenepyrrolidinium groups is between 4 and 20.

15. A process for preparing a homo-or copolymer as claimed in claim 5 wherein the Bronstedt acid is a halide, alone or together with an unsaturated comonomer.

* * * * *